United States Patent [19]
Santa, Jr.

[11] Patent Number: 6,039,324
[45] Date of Patent: Mar. 21, 2000

[54] BULKHEAD PENETRATOR AND METHOD FOR SEPARATING CABLES FROM A BULKHEAD PENETRATOR

[76] Inventor: Gene J. Santa, Jr., 56 Maplewood Rd., Middletown, R.I. 02842

[21] Appl. No.: 09/008,921

[22] Filed: Jan. 20, 1998

[51] Int. Cl.$^7$ .................................................. H02G 15/113
[52] U.S. Cl. ............................ 277/606; 277/632; 174/92
[58] Field of Search ................................... 277/632, 603, 277/606; 174/92, 93, 97, 153 G, 152 G

[56] References Cited

U.S. PATENT DOCUMENTS

| | | | |
|---|---|---|---|
| 2,022,529 | 11/1935 | Townsend | 277/627 |
| 4,421,945 | 12/1983 | Moisson | 174/92 |
| 4,538,021 | 8/1985 | Williamson | 174/92 |
| 5,155,303 | 10/1992 | Bensel, III et al. | 174/93 |
| 5,406,032 | 4/1995 | Clayton et al. | 174/151 |
| 5,839,881 | 11/1998 | Yu | 416/5 |

*Primary Examiner*—Anthony Knight
*Assistant Examiner*—Alison K. Pickard
*Attorney, Agent, or Firm*—Michael J. McGowan; Prithvi C. Lall; Michael F. Oglo

[57] ABSTRACT

In a bulkhead penetrator comprising a housing, a first grommet plate having peripheral recesses therein and adapted to be received by the housing, a grommet for disposition adjacent the first grommet plate in the housing and having bores therein alignable with the recesses, a second grommet plate for disposition adjacent the grommet in the housing and having peripheral recesses alignable with the bores of the grommet, and a retaining ring for connection to the housing to lock the second grommet plate, the grommet, and the first grommet plate in the housing with the second grommet plate recesses and the grommet bores and the first grommet plate recesses being adapted to receive and retain cables extending from outside the bulkhead, through the penetrator, and into a compartment defined in part by the bulkhead, an improvement wherein the retaining ring comprises a plurality of discrete sections, each of the sections being mountable on the housing, and the grommet comprises a plurality of discrete portions, each of the grommet portions having one of the bores therein. There is further contemplated a method for separation of cables from such a penetrator.

2 Claims, 2 Drawing Sheets

BULKHEAD PENETRATOR AND METHOD FOR SEPARATING CABLES FROM A BULKHEAD PENETRATOR

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The invention relates to bulkhead penetrators by which cables are extended through bulkheads, and is directed more particularly to an improved penetrator permitting less time consuming repairs and replacements, and to an improved method for separating the cables from the penetrator.

(2) Description of the Prior Art

In undersea vehicles, control cables extend through bulkheads which in part define ballast tanks. Penetrators serve as watertight passageways by which the cables enter and leave the ballast tanks. Typically, there are a plurality of cables, often of different diameters, per ballast tank bulkhead assembly.

In FIG. 1, there is shown a known, six cable, bulkhead penetrator comprising a housing 10 which extends through a bulkhead B of a ballast tank T, or other compartment. The housing 10 is cylindrically-shaped and is provided with threaded holes 12 in an end 14 thereof. A first grommet plate 16 is a disc-like member adapted for disposition in housing 10 and having six peripheral recesses 18 therein which extend inwardly toward a center portion of first grommet plate 16 from a periphery thereof. The recesses 18 are of two sizes to accommodate two different diameter cables. A typical cable C is shown in FIG. 1 for illustrative purposes. A grommet 20, of molded rubber, or the like, is of a circular configuration and is adapted to be disposed adjacent to first grommet plate 16 in housing 10. Grommet 20 is provided with six bores 22, each sized to accommodate one of the aforementioned cables. The six bores 22 of grommet 20 are alignable with the six recesses 18 of first grommet plate 16. The grommet 20 is provided with slits 24, each slit 24 extending from one of the bores 22 to a periphery 26 of grommet 20.

The known bulkhead penetrator further includes a second grommet plate 30 similar to first grommet plate 16 and having similar peripheral recesses 32 therein. Second grommet plate 30 is adapted to be disposed in housing 10 adjacent grommet 20 with recesses 32 aligned with bores 22. A retaining ring 34 is connectable to end 14 of housing 10, as by screws 36, to lock second grommet plate 30, grommet 20, and first grommet plate 16 in place in housing 10. Cables C extend through retaining ring 34, second grommet plate recesses 32, grommet bores 22, and first grommet plate recesses 18.

In disassembling the penetrator for repair or replacement, the first step is to unbolt the retaining ring 34. Note that because ring 34 is a single piece, it can be moved away from plate 30 only to the first cable bend which is often located close to plate 30. The next step is the removal of second grommet plate 30. Because retaining ring 34 cannot be moved far enough from grommet plate 30 to permit easy removal of cables C from recesses 32 of grommet plate 30, the operator must radially bow out all the cables to a diameter larger than that of plate 30 in order to remove plate 30. The next step is to remove the rubber grommet 20. Grommet 20, having substantial thickness, completely encircles the cables. All six cables must be pulled free of grommet 30 before the grommet can be removed. Because of the cable diameters and the grommet thickness, it is common to pry the cables through the grommet bores 22 using slits 24. These slits are of some assistance in permitting the cables to be pulled through the grommets, but the task is still a difficult one and often damaging to the cables. Because of the restrictive limited access to the penetrator area, the above steps are quite difficult and very time consuming.

Accordingly, there is a need for a bulkhead penetrator which permits easier and faster disassembly thereof without damaging the cables. There is further a need for an improved method for separating cables from a bulkhead penetrator.

SUMMARY OF THE INVENTION

An object of the invention is, therefore, to provide an improved bulkhead penetrator which permits disassembly without damage to the cables.

A further object is to provide a bulkhead penetrator that facilitates quicker and easier disassembly thereof for the removal and replacement of cables.

A still further object of the invention is to provide a method for separating cables from a bulkhead penetrator.

With the above and other objects in view, as will hereinafter appear, a feature of the present invention is the provision of an improvement to a bulkhead penetrator comprising a housing, a first grommet plate having peripheral recesses therein and adapted to be received by the housing, a grommet for disposition adjacent the first grommet plate in the housing and having bores therein alignable with the recesses, a second grommet plate for disposition adjacent the grommet in the housing and having peripheral recesses alignable with the bores of the grommet, and a retaining ring for connection to the housing to lock the second grommet plate, the grommet, and the first grommet plate in the housing with the second grommet plate recesses and the grommet bores and the first grommet plate recesses being adapted to receive and retain cables extending from outside the bulkhead, through the penetrator, into a compartment defined in part by the bulkhead. According to the improvement, the retaining ring comprises a plurality of discrete sections, each of the sections being mountable on the housing, and the grommet comprises a plurality of discrete portions, each of the grommet portions having one of the bores therein.

In accordance with a further feature of the invention, there is provided a method for separating cables from a bulkhead penetrator in which the cables are disposed, the penetrator comprising a housing, a first grommet plate disposed in the housing and having peripheral recesses therein, a grommet comprising a plurality of pie-shaped discrete portions, each of the grommet portions having a bore therein, the grommet being disposed in the housing adjacent the first grommet plate with the grommet bores being aligned with the first grommet plate recesses, a second grommet plate disposed in the housing adjacent the grommet and having peripheral recesses therein aligned with the grommet bores, and a retaining ring connected to the housing and adjacent the second grommet plate and locking the grommet plates and the grommet in the housing, and each of the cables extending through the retaining ring, one of the recesses in the second grommet plate, one of the bores in the grommet and one of the recesses in the first grommet plate. The method comprises the steps of removing sections of the retaining ring from the housing and from around the cables until all of the retaining ring is removed from the housing and from around the cables, spreading the cables outwardly to free the cables from the second grommet plate, removing the second grommet plate from the housing, sliding a portion of the grommet in which one of the cables is disposed along the cable disposed therein to remove the grommet portion from the housing and the one cable, and sliding remaining portions of the grommet off their respective cables, spreading the cables outwardly and removing therefrom and from the housing the first grommet plate, and removing the cables from the housing.

The above and other features of the invention, including various novel details of construction and combinations of parts and method steps, will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
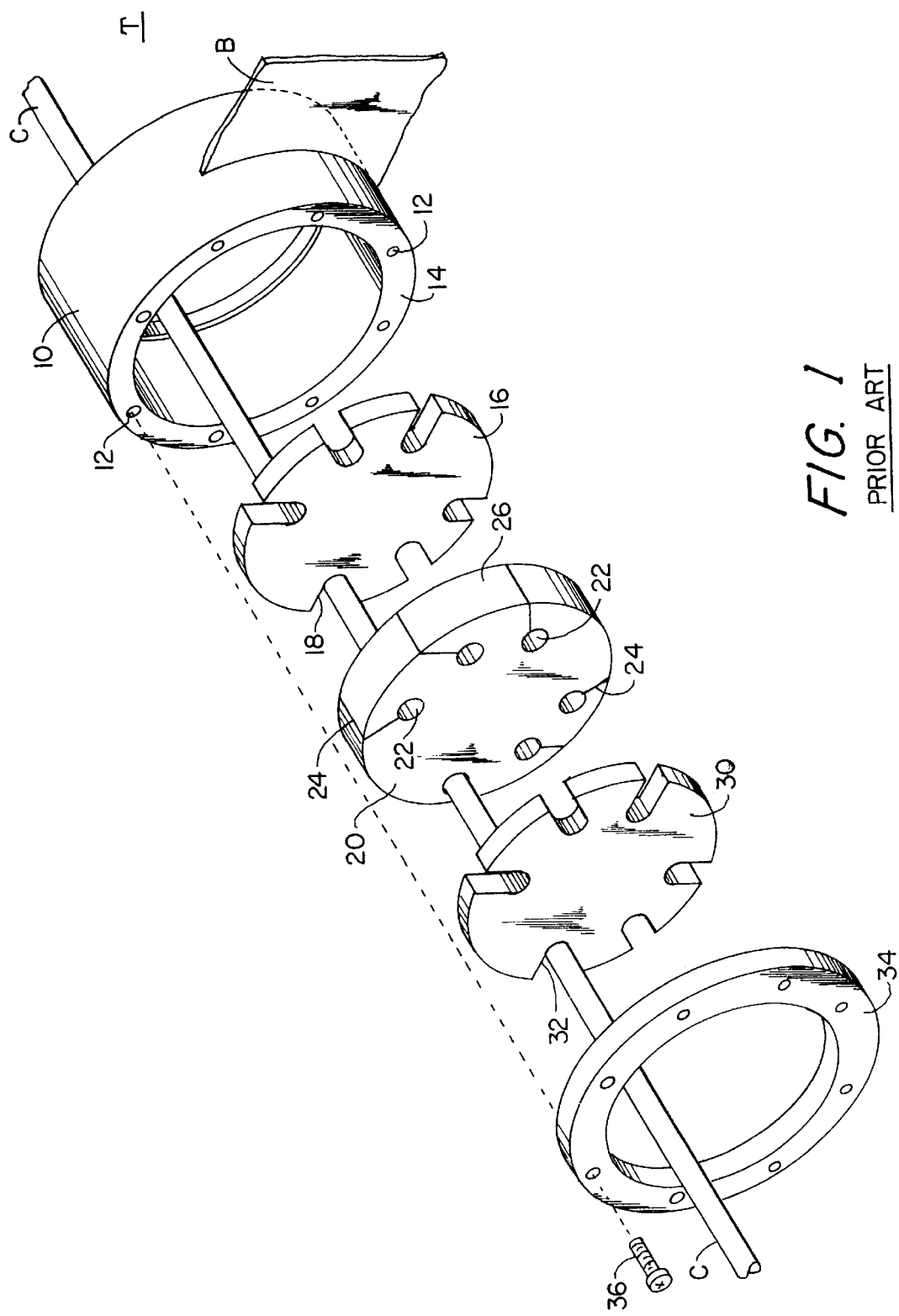
FIG. 1 is an exploded perspective view of a prior art bulkhead penetrator.
Figure 2:
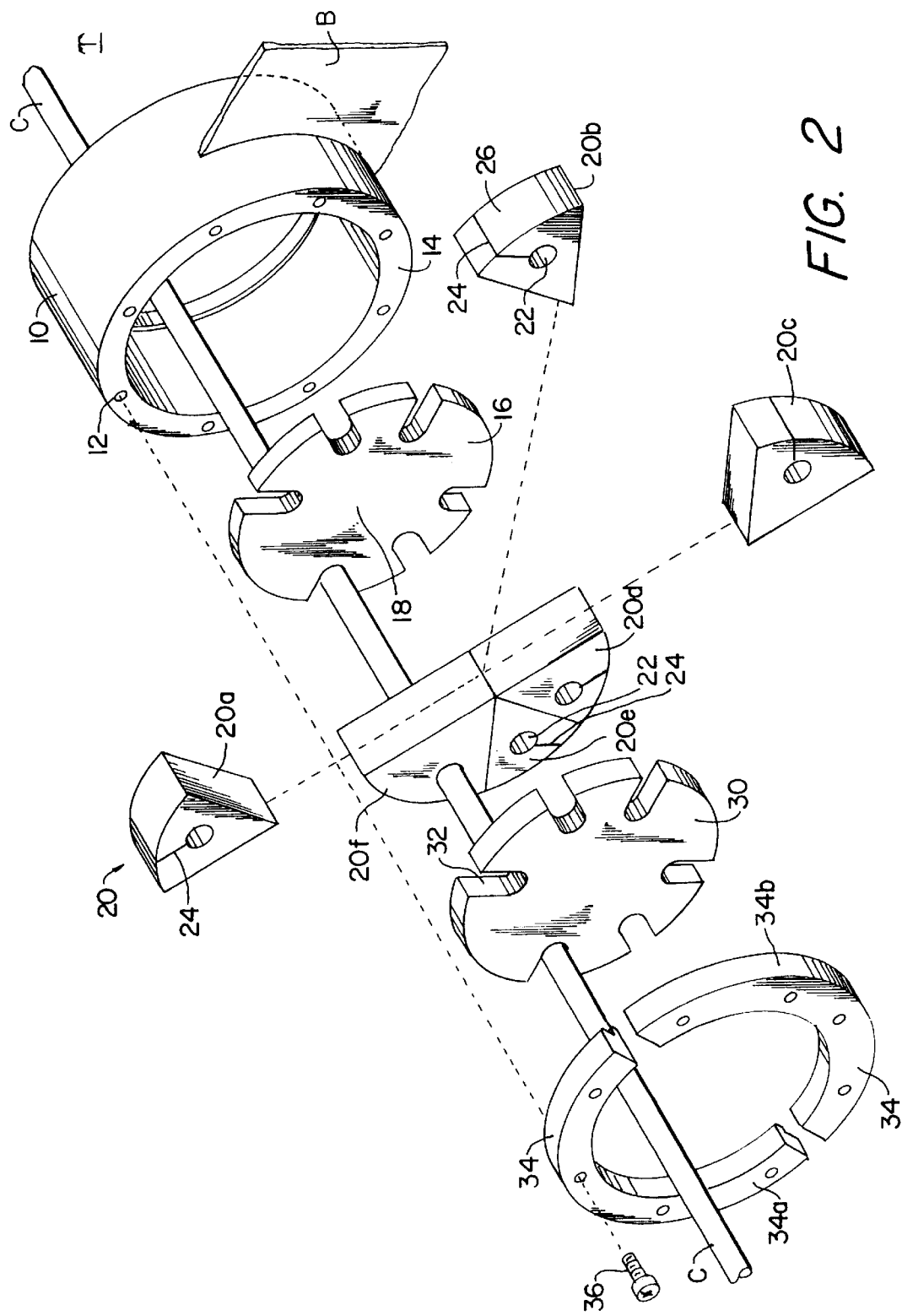
FIG. 2 is an exploded perspective view of one form of bulkhead penetrator illustrative of an embodiment of the invention.

Referring to FIG. 2, it will be seen that the illustrative, six cable, penetrator includes the housing 10, first grommet plate 16 and second grommet plate 30 of the known penetrator of FIG. 1.

The penetrator of FIG. 2 further includes the retainer ring 34 in at least two separate sections 34a, 34b. Thus, upon removal of retaining ring 34 from housing end surface 14, the retaining ring may be separated and the constituent sections 34a, 34b, thereof removed entirely from around cables C, permitting the cables to be spread and easily removed from recesses 32 of second grommet plate 30.

The grommet 20 of FIG. 2 is divided into a number of pie-shaped portions 20a–20f corresponding to the number of cables, each having a bore 22 therethrough, and a slit 24 therein. As illustrated in FIG. 2, the grommet 20 is of circular configuration and the portions 20a–20f are substantially defined by radii which divide the circle into sectors, each sector being a grommet portion; Thus, the grommet portion easiest to handle, such as portion 20b can be readily removed from grommet 20 and either removed or slid along its cable and out of the way. Once rid of portion 20b, portion 20a or portion 20c would likely be readily accessible and easily removed, and so on, until all portions of grommet 20 are removed from the cables, leaving the cables readily removable from grommet plate 16 by spreading or bowing, of the cables.

There is thus provided a bulkhead penetrator which is relatively easily taken apart to permit withdrawal of the cables through housing 10.

The penetrator described hereinabove permits relatively fast and easy separation of cables from a bulkhead penetrator. The method for cable removal includes removing sections 34a and 34b of retaining ring 34 from housing 10 by unscrewing and removing screws 36 (FIG. 2). The sections 34a, 34b are then removed from around the cables C, which are then easily spread outwardly to free the cables from second grommet plate 30, which is removed from housing 10, as well as the cables. A portion, such as portion 20a, of grommet 20 is then slid along the cable therein and removed from the penetrator site. Remaining grommet portions, such as portions 20b–20f are similarly removed from their respective cables or slid along their cables to a site removed from the penetrator. The cables are then easily spread and removed from recesses 18 of first grommet plate 16, permitting the first grommet plate to be removed, and permitting withdrawal of the cables from the compartment T, through housing 10.

There is thus provided a method for separating cables from a bulkhead penetrator, the method being operative to provide a substantial reduction in time required for cable installation or replacement, and a substantial reduction in costs resulting from reduced cable damage.

It is to be understood that the present invention is by no means limited to the particular construction and method steps herein disclosed and/or shown in the drawings, but also comprises any modifications or equivalents within the scope of the claims. For example, the number and diameter of the cables may be varied without deviating from the teachings of the present invention. Likewise, the number of ring 34 portions may also be varied.

What is claimed is:

1. In a bulkhead penetrator comprising a housing, a first grommet plate having peripheral recesses therein and adapted to be received by said housing, a grommet for disposition adjacent said first grommet plate in said housing and having bores therein alignable with said recesses, a second grommet plate for disposition adjacent said grommet in said housing and having peripheral recesses alignable with said bores of said grommet, and a retaining ring for connection to said housing to lock said second grommet plate, said grommet, and said first grommet plate in said housing, said second grommet plate recesses and said grommet bores and said first grommet plate recesses being adapted to receive and retain cables extending from outside said bulkhead, substantially axially through said penetrator, into a compartment defined in part by said bulkhead, an improvement wherein:

said retaining ring comprises a plurality of discrete annular sections, each of said sections being mountable on said housing upon disconnection from said housing, being movable away from said cables in directions transverse to an axis of said penetrator; and said grommet comprises a plurality of discrete portions, each of said grommet portions having one of said bores therein, and a slit therein extending from said one bore to a periphery of said grommet, each of said portions having a peripheral edge comprising, a portion of a circle, and first and second edges extending from a center of the circle radially outwardly to said peripheral edge, each of said grommet portions being movable along only one of said cables and being movable radially outwardly from the axis of the penetrator.

2. A method for separating cables from a bulkhead penetrator in which the cables are disposed, the penetrator comprising a housing, a first grommet plate disposed in said housing and having peripheral recesses therein, a grommet comprising a plurality of pie-shaped discrete portions, each of said grommet portions having a bore therein, said grommet being disposed in said housing adjacent said first grommet plate with said grommet bores being aligned with said first grommet plate recesses, a second grommet plate disposed in said housing adjacent said grommet and having peripheral recesses therein aligned with said grommet bores, and a retaining ring connected to said housing and adjacent said second grommet plate and locking said grommet plates and said grommet in said housing, said retaining ring comprising a plurality of discrete sections, and each of said cables extending through only one of said retaining ring sections, one of said recesses in said second grommet plate, one of said bores in one of said grommet portions and one of said recesses in said first grommet plate, the method comprising the steps of:

removing sections of said retaining ring from said housing and from around said cables by moving said sections away from said cables in directions transverse to an axis of said penetrator, until all of said retaining ring sections are removed from said housing and from around said cables;

bowing said cables outwardly from the axis of said penetrator to free said cables from said second grommet plate;

removing said second grommet plate from said housing;

sliding one of said portions of said grommet in which one of said cables is disposed along the cable disposed therein, and moving said one grommet portion radially outwardly from the axis of the penetrator, to remove said one grommet portion from said housing and said one cable, and moving remaining portions of said grommet by sliding the remaining portions of said grommet radially outwardly from the axis of the penetrator and off their respective cables;

spreading said cables outwardly and removing therefrom and from said housing said first grommet plate; and removing said cables from said housing.

* * * * *